US010747887B2

United States Patent
Nakajima et al.

(10) Patent No.: US 10,747,887 B2
(45) Date of Patent: Aug. 18, 2020

(54) VULNERABILITY DETECTION DEVICE, VULNERABILITY DETECTION METHOD, AND VULNERABILITY DETECTION PROGRAM

(71) Applicant: NIPPON TELEGRAPH AND TELEPHONE CORPORATION, Chiyoda-ku (JP)

(72) Inventors: Asuka Nakajima, Musashino (JP); Makoto Iwamura, Musashino (JP); Takeshi Yada, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 270 days.

(21) Appl. No.: 15/749,174

(22) PCT Filed: Sep. 20, 2016

(86) PCT No.: PCT/JP2016/077738
§ 371 (c)(1),
(2) Date: Jan. 31, 2018

(87) PCT Pub. No.: WO2017/061270
PCT Pub. Date: Apr. 13, 2017

(65) Prior Publication Data
US 2018/0225460 A1  Aug. 9, 2018

(30) Foreign Application Priority Data
Oct. 9, 2015 (JP) .................. 2015-201165

(51) Int. Cl.
*G06F 21/00* (2013.01)
*G06F 21/57* (2013.01)
*H04L 29/06* (2006.01)

(52) U.S. Cl.
CPC ............ *G06F 21/577* (2013.01); *G06F 21/57* (2013.01); *H04L 63/1433* (2013.01); *G06F 2221/033* (2013.01)

(58) Field of Classification Search
CPC ..... G06F 21/57; G06F 21/577; H04L 63/1433
See application file for complete search history.

(56) References Cited

U.S. PATENT DOCUMENTS 6,282,698 B1   8/2001  Baker et al.
7,284,273 B1 * 10/2007  Szor ..................... G06F 21/564
                                                                        726/22

(Continued)

FOREIGN PATENT DOCUMENTS

| EP | 3 159 823 A1 | 4/2017 |
| JP | 2009-193161 A | 8/2009 |
| JP | 2011-86147 A | 4/2011 |

OTHER PUBLICATIONS

Extended European Search Report dated Mar. 1, 2019, in Patent Application No. 16853424.6, 8 pages.
International Search Report dated Nov. 1, 2016 in PCT/JP2016/077738 filed Sep. 20, 2016.
Jiyong Jang et al., "ReDeBug: Finding Unpatched Code Clones in Entire OS Distributions", IEEE Symposium on Security and Privacy, 2012, 15 total pages.

(Continued)

*Primary Examiner* — Jeffrey C Pwu
*Assistant Examiner* — Thong P Truong
(74) *Attorney, Agent, or Firm* — Oblon, McClelland, Maier & Neustadt, L.L.P.

(57) ABSTRACT

A vulnerability detection device includes a vulnerability portion extracting unit that extracts a first program code corresponding to an uncorrected vulnerability portion of software, a normalization processing unit that normalizes a parameter varying depending on compilation environment, among parameters included in the extracted first program code and in a second program code of software as a target to be tested for the vulnerability portion, a similarity calculating unit that calculates a similarity of an arbitrary portion of the second program code after normalization as a com- (Continued)

parison target to the first program code, and a determining unit that refers to vulnerability related information for a portion of the second program code in which the calculated first similarity exceeds a predetermined threshold, and that determines whether the portion of the second program code is an unknown vulnerability portion.

5 Claims, 8 Drawing Sheets

(56) References Cited

U.S. PATENT DOCUMENTS

| | | |
|---|---|---|
| 8,819,856 B1 | 8/2014 | Tiffe et al. |
| 2015/0058984 A1* | 2/2015 | Shen ................. G06F 21/52 726/23 |
| 2017/0286692 A1 | 10/2017 | Nakajima et al. |

OTHER PUBLICATIONS

Hongzhe Li et al., "A Scalable Approach for Vulnerability Discovery Based on Security Patches", Application and Techniques in Information Security, 2014, 14 total pages.

Andreas Saebjoernsen et al., "Detecting Code Clones in Binary Executables", Proceedings of ISSTA '09, 2009, pp. 1-11.

Saul B. Needleman et al., "A General Method Applicable to the Search for Similarities in the Amino Acid Sequence of Two Proteins", Journal of Molecular Biology, 1970, vol. 48, pp. 443-453.

Osamu Gotoh, "An Improved Algorithm for Matching Biological Sequences", Journal of Molecular Biology, 1982, vol. 162, pp. 705-708.

Jannik Pewny et al., "Cross-Architecture Bug Search in Binary Executables", 2015 IEEE Symposium on Security and Privacy, May 18, 2015, pp. 709-724.

\* cited by examiner

FIG.4

MATRIX X

| 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|
| -2 | -2 | 2 | -1.5 | -2 | -2 | -2 | -2 | -2 | 2 | 2 | -1.5 | -2 | -2 | -2 | -2 | -2 | -2 | -2 |
| -4 | 0 | -1.5 | 4 | 0.5 | 0 | -0.5 | 0 | 0 | -1.5 | 0 | 4 | 0.5 | 0 | -0.5 | -1 | -1.5 | -2 | -2.5 |
| -6 | -3.5 | -2 | 0.5 | 6 | 2.5 | 2 | 1.5 | 1 | 0.5 | 0 | 0.5 | 2 | -1.5 | -2 | -2.5 | -3 | -3.5 | -4 |
| -8 | -4 | -2.5 | 0 | 2.5 | 8 | 4.5 | 4 | 3.5 | 3 | 2.5 | 2 | 1.5 | 1 | 0.5 | 0 | -0.5 | -1 | -1.5 |
| -10 | -4.5 | -3 | -0.5 | 2 | 4.5 | 10 | 6.5 | 6 | 5.5 | 5 | 4.5 | 4 | 3.5 | 3 | 2.5 | 2 | 1.5 | 1 |
| -12 | -5 | -3.5 | -1 | 1.5 | 4 | 6.5 | 8 | 4.5 | 4 | 3.5 | 3 | 6.5 | 6 | 2.5 | 2 | 1.5 | 1 | 0.5 |
| -14 | -5.5 | -4 | -1.5 | 1 | 3.5 | 6 | 4.5 | 6 | 2.5 | 2 | 1.5 | 5 | 8.5 | 5 | 4.5 | 4 | 3.5 | 3 |
| -16 | -6 | -4.5 | -2 | 0.5 | 3 | 5.5 | 4 | 2.5 | 4 | 0.5 | 0 | 2.5 | 5 | 10.5 | 7 | 6.5 | 6 | 5.5 |
| -18 | -6.5 | -5 | -2.5 | 0 | 2.5 | 5 | 3.5 | 2 | 0.5 | 2 | -0.5 | 2 | 4.5 | 7 | 12.5 | 9 | 8.5 | 8 |
| -20 | -7 | -5.5 | -3 | -0.5 | 2 | 4.5 | 3 | 1.5 | 0 | -0.5 | 0 | 1.5 | 4 | 6.5 | 9 | 14.5 | 11 | 10.5 |
| -22 | -7.5 | -6 | -3.5 | -1 | 1.5 | 4 | 2.5 | 1 | -0.5 | -1 | -1.5 | 1 | 3.5 | 6 | 8.5 | 11 | 16.5 | 13 |
| -24 | -8 | -6.5 | -4 | -1.5 | 1 | 3.5 | 2 | 0.5 | -1 | -1.5 | -2 | 0.5 | 3 | 5.5 | 8 | 10.5 | 13 | 18.5 |

$j_{max}$

FIG.5

MATRIX Y

| $-\infty$ | $-\infty$ | $-\infty$ | $-\infty$ | $-\infty$ | $-\infty$ | $-\infty$ | $-\infty$ | $-\infty$ | $-\infty$ | $-\infty$ | $-\infty$ | $-\infty$ | $-\infty$ | $-\infty$ | $-\infty$ | $-\infty$ | $-\infty$ | $-\infty$ | $-\infty$ |
|---|---|---|---|---|---|---|---|---|---|---|---|---|---|---|---|---|---|---|---|
| 0 | -3.5 | -3.5 | -3.5 | -3.5 | -3.5 | -3.5 | -3.5 | -3.5 | -3.5 | -3.5 | -3.5 | -3.5 | -3.5 | -3.5 | -3.5 | -3.5 | -3.5 | -3.5 | -3.5 |
| 0 | -4 | -1.5 | -4 | -4 | -4 | -4 | -4 | -4 | -4 | -1.5 | -1.5 | -4 | -4 | -4 | -4 | -4 | -4 | -4 | -4 |
| 0 | -3.5 | -2 | 0.5 | -3 | -3.5 | -4 | -3.5 | -3.5 | -2 | -2 | 0.5 | -3 | -3.5 | -4 | -4.5 | -4.5 | -4.5 | -4.5 | -4.5 |
| 0 | -4 | -2.5 | 0 | 2.5 | -1 | -1.5 | -2 | -2.5 | -2.5 | -2.5 | 0 | -1.5 | -4 | -4.5 | -5 | -5 | -5 | -5 | -5 |
| 0 | -4.5 | -3 | -0.5 | 2 | 4.5 | 1 | 0.5 | 0 | -0.5 | -1 | -0.5 | -2 | -2.5 | -3 | -3.5 | -4 | -4.5 | -5 | |
| 0 | -5 | -3.5 | -1 | 1.5 | 4 | 6.5 | 3 | 2.5 | 2 | 1.5 | 1 | 0.5 | 0 | -0.5 | -1 | -1.5 | -2 | -2.5 | |
| 0 | -5.5 | -4 | -1.5 | 1 | 3.5 | 6 | 4.5 | 2 | 1.5 | 1 | 0.5 | 3 | 2.5 | -1 | -1.5 | -2 | -2.5 | -3 | |
| 0 | -6 | -4.5 | -2 | 0.5 | 3 | 5.5 | 4 | 2.5 | 1 | 0.5 | 0 | 2.5 | 5 | 1.5 | 1 | 0.5 | 0 | -0.5 | |
| 0 | -6.5 | -5 | -2.5 | 0 | 2.5 | 5 | 3.5 | 2 | 0.5 | 0 | -0.5 | 2 | 4.5 | 7 | 3.5 | 3 | 2.5 | 2 | |
| 0 | -7 | -5.5 | -3 | -0.5 | 2 | 4.5 | 3 | 1.5 | 0 | -0.5 | -1 | 1.5 | 4 | 6.5 | 9 | 5.5 | 5 | 4.5 | |
| 0 | -7.5 | -6 | -3.5 | -1 | 1.5 | 4 | 2.5 | 1 | -0.5 | -1 | -1.5 | 1 | 3.5 | 6 | 8.5 | 11 | 7.5 | 7 | |
| 0 | -8 | -6.5 | -4 | -1.5 | 1 | 3.5 | 2 | 0.5 | -1 | -1.5 | -2 | 0.5 | 3 | 5.5 | 8 | 10.5 | 13 | 9.5 | |

FIG.6

MATRIX Z

| -∞ | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|
| -∞ | -5.5 | -5.5 | -1.5 | -2 | -2.5 | -3 | -3.5 | -4 | -4.5 | -1.5 | -1.5 | -2 | -2.5 | -3 | -3.5 | -4 | -4.5 | -5 |
| -∞ | -7.5 | -3.5 | -4 | 0.5 | 0 | -0.5 | -1 | -1.5 | -2 | -2.5 | -3 | 0.5 | 0 | -0.5 | -1 | -1.5 | -2 | -2.5 |
| -∞ | -9.5 | -7 | -5.5 | -3 | 2.5 | 2 | 1.5 | 1 | 0.5 | 0 | -0.5 | -1 | -1.5 | -2 | -2.5 | -3 | -3.5 | -4 |
| -∞ | -11.5 | -7.5 | -6 | -3.5 | -1 | 4.5 | 4 | 3.5 | 3 | 2.5 | 2 | 1.5 | 1 | 0.5 | 0 | -0.5 | -1 | -1.5 |
| -∞ | -13.5 | -8 | -6.5 | -4 | -1.5 | 1 | 6.5 | 6 | 5.5 | 5 | 4.5 | 4 | 3.5 | 3 | 2.5 | 2 | 1.5 | 1 |
| -∞ | -15.5 | -8.5 | -7 | -4.5 | -2 | 0.5 | 3 | 4.5 | 4 | 3.5 | 3 | 2.5 | 3 | 2.5 | 2 | 1.5 | 1 | 0.5 |
| -∞ | -17.5 | -9 | -7.5 | -5 | -2.5 | 0 | 2.5 | 2 | 2.5 | 2 | 1.5 | 1 | 1.5 | 5 | 4.5 | 4 | 3.5 | 3 |
| -∞ | -19.5 | -9.5 | -8 | -5.5 | -3 | -0.5 | 2 | 1.5 | 1 | 0.5 | 0 | -0.5 | -1 | 1.5 | 7 | 6.5 | 6 | 5.5 |
| -∞ | -21.5 | -10 | -8.5 | -6 | -3.5 | -1 | 1.5 | 1 | 0.5 | 0 | -0.5 | -1 | -1.5 | 1 | 3.5 | 9 | 8.5 | 8 |
| -∞ | -23.5 | -10.5 | -9 | -6.5 | -4 | -1.5 | 1 | 0.5 | 0 | -0.5 | -1 | -1.5 | -2 | 0.5 | 3 | 5.5 | 11 | 10.5 |
| -∞ | -25.5 | -11 | -9.5 | -7 | -4.5 | -2 | 0.5 | 0 | -0.5 | -1 | -1.5 | -2 | -2.5 | 0 | 2.5 | 5 | 7.5 | 13 |
| -∞ | -27.5 | -11.5 | -10 | -7.5 | -5 | -2.5 | 0 | -0.5 | -1 | -1.5 | -2 | -2.5 | -3 | -0.5 | 2 | 4.5 | 7 | 9.5 |

VULNERABILITY DETECTION DEVICE, VULNERABILITY DETECTION METHOD, AND VULNERABILITY DETECTION PROGRAM

FIELD

The present invention relates to a vulnerability detection device, a vulnerability detection method, and a vulnerability detection program.

BACKGROUND

One of fundamental causes of cyber attacks and malware infections is vulnerability that exists in software. Attackers performs malicious acts on a computer through attack codes using vulnerability and malware. In order to prevent such attacks beforehand, it is important to take measures to detect and correct a vulnerability before being attacked by attackers and to cause the attackers not to use the vulnerability as footholds of attacks.

Under these circumstances, research is been carried out on a technique of testing software and detecting a vulnerability that exists in the software. One of techniques of detecting a vulnerability that exists in the software is a vulnerability detection technique using a code clone.

The code clone indicates a code that is similar or identical to another in software. The code clone is caused by an act of copying and pasting a source code of another program having similar functions in order to realize a program having a specific function during development of software by software developers. Here, when a vulnerability is detected in a source code of a copy source, it is necessary not only to correct the source code of the copy source but also to correct a source code of a copy destination. However, even if the vulnerability is detected in the copy source, it is difficult to correct the vulnerability caused by the code clone unless the developer knows all of detected code clones of the vulnerability portion. The vulnerability detection technique using the code clone is a technique of detecting unknown vulnerability in software to be tested by detecting a code clone of a portion in which the vulnerability is detected in the software to be tested.

As a vulnerability detection technique using the code clone, there is a method using a source code of software (see Non Patent Literature 1 and Non Patent Literature 2). In this method, a code clone of a vulnerability portion contained in software to be tested is detected by extracting the source code of the vulnerability portion from the software where vulnerability is detected in the past and by testing the source code of the software to be tested.

CITATION LIST

Patent Literature

Patent Literature 1: Japanese Patent Application No. 2009-193161
Non Patent Literature 1: J. Jang, A. Agrawal, and D. Brumley, "ReDeBug: Finding Unpatched Code Clones in Entire OS Distributions", In IEEE Symposium on Security and Privacy, 2012.
Non Patent Literature 2: Hongzhe Li, Hyuckmin Kwon, Jonghoon Kwon, and Hee jo Lee, "A Scalable Approach for Vulnerability detection Based on Security Patches", Application and Techniques in Information Security, 2014.
Non Patent Literature 3: Andreas Saebjoernsen, Jeremiah Willcock, Thomas Panas, Daniel Quinlan, and Zhendong Su, "Detecting Code Clones in Binary Executables", In Proceedings of ISSTA '09, 2009.
Non Patent Literature 4: S B. Needleman, C D. Wunsch, "A General Method Applicable to the Search for Similarities in the Amino Acid Sequence of Two Proteins", Journal of Molecular Biology vol. 48, p 443-453, 1970.
Non Patent Literature 5: Gotoh Osamu, "An Improved Algorithm for Matching Biological Sequences", Journal of Molecular Biology. 162, p 705-708, 1982.

SUMMARY

Technical Problem

However, there is no technique for detecting a vulnerability using the code clone with a program code of the software as a target to be tested. In other words, it is necessary for the software developers to know the source code of the software to be tested in order to detect the vulnerability of the software using the code clone. Therefore, for the software that is difficult to obtain or use the source code (for example, privately owned software or software with monopoly/exclusive right set up), it is difficult to detect an unknown vulnerability.

It is therefore an object of the present invention to solve the problems and to detect an unknown vulnerability even when there is no source code of software to be tested.

Solution to Problem

To solve the problems, the present invention is a vulnerability detection device including: an extracting unit that extracts a first program code corresponding to an uncorrected vulnerability portion of software; a normalization processing unit that normalizes a parameter varying depending on compilation environment, among parameters included in the first program code extracted by the extracting unit and in a second program code of software as a target to be tested for the vulnerability portion; a similarity calculating unit that calculates a first similarity which is a similarity of an arbitrary portion of the second program code after normalization as a comparison target to the first program code; a determining unit that refers to vulnerability related information for a portion of the second program code in which the calculated first similarity exceeds a predetermined threshold, and that determines whether the portion of the second program code is an unknown vulnerability portion; and an output unit that outputs the portion of the second program code determined as the unknown vulnerability portion.

Advantageous Effects of Invention

According to the present invention, even when there is no source code of software to be tested, it is possible to detect an unknown vulnerability.

BRIEF DESCRIPTION OF DRAWINGS

FIG. 4 is a diagram illustrating an example of a matrix X used for similarity calculation.

FIG. 5 is a diagram illustrating an example of a matrix Y used for similarity calculation.

FIG. 6 is a diagram illustrating an example of a matrix Z used for similarity calculation.

DESCRIPTION OF EMBODIMENTS

Exemplary embodiments of the present invention will be explained below with reference to the accompanying drawings. The present invention is not limited by the embodiments explained below.

Figure 1:
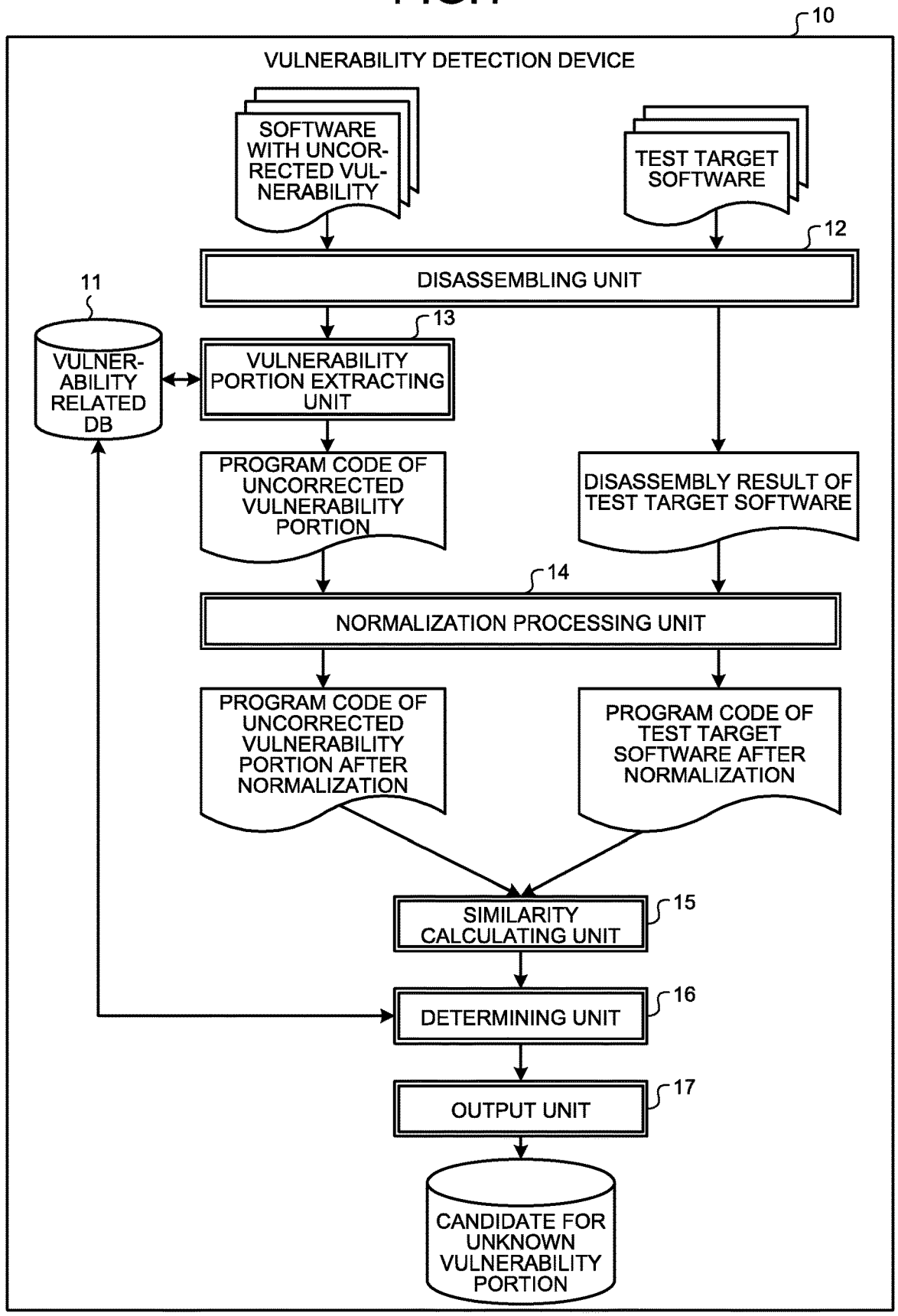
FIG. 1 is a block diagram illustrating a configuration of a vulnerability detection device.

First of all, a configuration of a vulnerability detection device 10 will be explained below with reference to FIG. 1. The vulnerability detection device 10 detects a vulnerability portion of software as a target to be tested (test target software) by using a code clone of the software. For example, the vulnerability detection device 10 detects a vulnerability portion from the program code of the test target software using a code clone of software with an uncorrected vulnerability (i.e., a patch is not applied). The vulnerability detection device 10 then compares the vulnerability portion with the program code to which the patch has been applied, and outputs the vulnerability portion as a candidate for an unknown vulnerability portion if it is not similar to the program code to which the patch has been applied.

The vulnerability detection device 10 includes a vulnerability related DB 11, a disassembling unit 12, a vulnerability portion extracting unit 13, a normalization processing unit 14, a similarity calculating unit 15, a determining unit 16, and an output unit 17.

The vulnerability related DB 11 stores vulnerability related information. The vulnerability related information is, for example, an attack verification code, CVE (Common Vulnerabilities and Exposures), security patch related to vulnerability, and a patch applied (corrected) program code.

The disassembling unit 12 disassembles software. For example, the disassembling unit 12 disassembles input test target software and software with an uncorrected vulnerability.

The vulnerability portion extracting unit 13 extracts the program code of the vulnerability portion from the disassembly result of the software. For example, when receiving the disassembly result of the software with the uncorrected vulnerability from the disassembling unit 12, the vulnerability portion extracting unit 13 refers to the vulnerability related information in the vulnerability related DB 11 to extract the program code of the vulnerability portion from the disassembly result.

To give a specific example, when using an attack verification code of the vulnerability related information, the vulnerability portion extracting unit 13 executes the attack verification code to the disassembly result of the software with the uncorrected vulnerability, and extracts a portion as a starting point of the attack as a program code of the vulnerability portion. Alternatively, when using the common vulnerabilities and exposures of the vulnerability related information, the vulnerability portion extracting unit 13 refers to CVEDB (Common Vulnerabilities and Exposures Data Base) to extract a portion specified based on information for the software as a program code of the vulnerability portion from the disassembly result of the software with the uncorrected vulnerability.

The normalization processing unit 14 performs a normalization process on the program code. The normalization process is a process of abstracting a portion (e.g., a type of register, a value of a memory address to be accessed, and a variable parameter such as an immediate value) that varies depending on compilation environment, of the program code obtained by disassembling.

For example, the normalization processing unit 14 acquires a program code of an uncorrected vulnerability portion from the vulnerability portion extracting unit 13, and acquires a disassembly result (program code of the test target software) of the test target software from the disassembling unit 12. The normalization processing unit 14 performs the normalization process on the program code of the uncorrected vulnerability portion and on the program code of the test target software.

Figure 2:
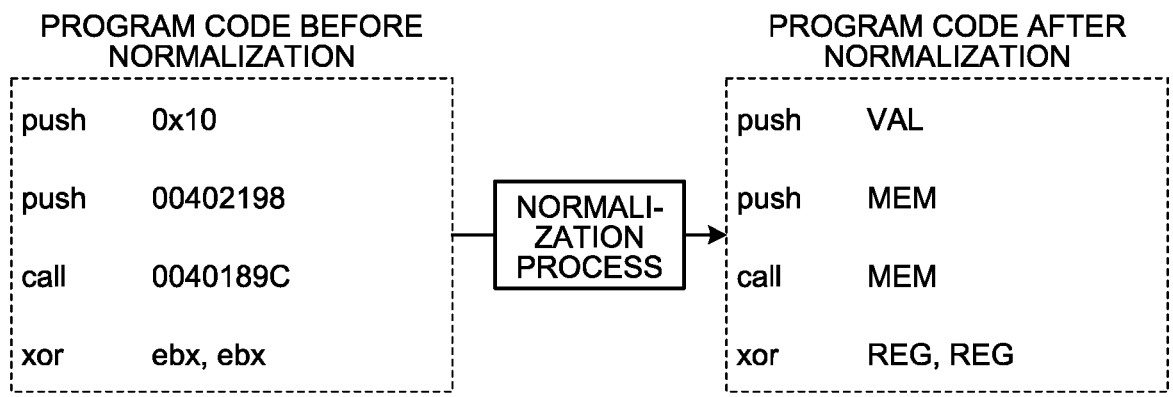
FIG. 2 is a diagram for explaining processing of a normalization processing unit.

To give a specific example, as illustrated in FIG. 2, the normalization processing unit 14 converts a portion that varies depending on the compilation environment into a character string indicating only its attribute. For example, the normalization processing unit 14 abstracts values of "0x10", "00402198", "0040189C", and "ebx, ebx" in the program code by being converted into character strings of "VAL", "MEM", "MEM", and "REG, REG", respectively. Thereby, the normalization processing unit 14 makes it possible to calculate an accurate similarity which is not influenced by the environment in which the test target software is compiled. In the normalization process, a contraction instruction which is information obtained by removing an operand part from a machine language instruction may be used.

The similarity calculating unit 15 calculates a similarity of an arbitrary portion of the program code of the test target software after normalization as a comparison target to the program code of the uncorrected vulnerability portion after normalization.

Figure 3:
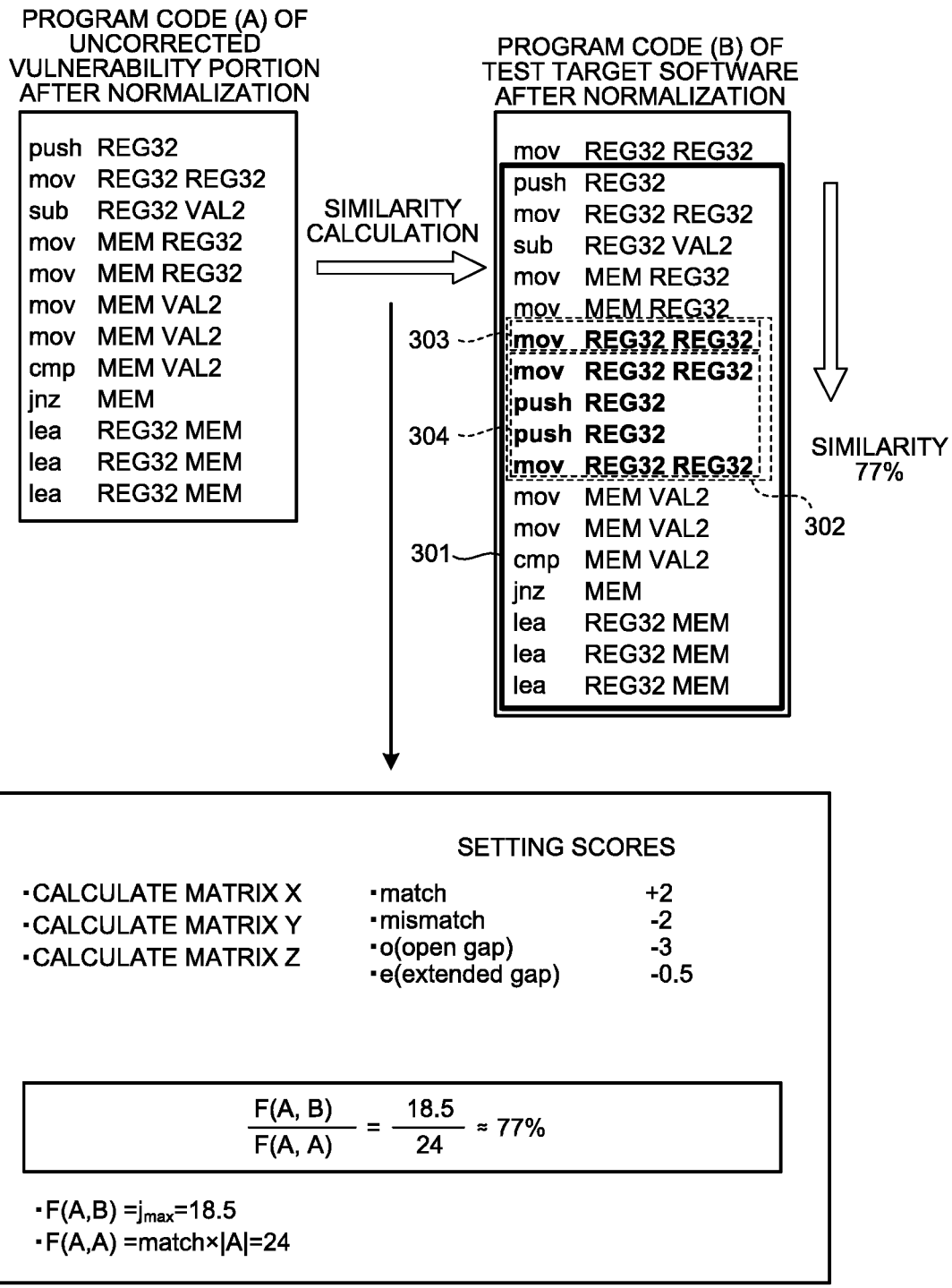
FIG. 3 is a diagram for explaining processing of a similarity calculating unit.

For example, as illustrated in FIG. 3, the similarity calculating unit 15 calculates a similarity of an arbitrary portion of a program code (B) of the test target software after normalization to an entire program code (A) of the uncorrected vulnerability portion after normalization. For example, the similarity calculating unit 15 calculates the similarity, as 77%, between the portion indicated by reference sign 302, of the program code (B) of the test target software after normalization, and the entire program code (A) of the uncorrected vulnerability portion after normalization. The detail of the similarity calculating unit 15 will be explained later.

Regarding a portion (e.g., a portion indicated by reference sign 301 of FIG. 3) of the program code of the test target software after normalization in which the similarity calculated by the similarity calculating unit 15 exceeds a predetermined threshold, the determining unit 16 refers to the vulnerability related DB 11 and determines whether the portion is an unknown vulnerability portion. The detail of the determining unit 16 will be explained later.

The output unit 17 outputs the portion determined as the unknown vulnerability portion by the determining unit 16, as a candidate for the unknown vulnerability portion.

Similarity Calculating Unit Details of the processing performed by the similarity calculating unit 15 will be explained next with reference to FIG. 3. Here, when the program code of the uncorrected vulnerability portion after normalization is A and the program code of the test target software after normalization is B, the portion similar to A in B is specified by calculating a score-based similarity.

Herein, it is assumed that the length of A is $|A|=M$, the length of B is $|B|=N$, $A=a_1^M=a_1, a_2, a_3, \ldots, a_M$, and $B=b_1^N=b_1, b_2, b_3, \ldots, b_N$. The score can be calculated by applying a technique (see Non Patent Literature 5) called "affine gap", which distinguishes deduction points according to the position in an insertion or deletion potion of a character string, to Needleman-Wunsch (see Non Patent Literature 4) which is a similar string search algorithm based on dynamic programming and further by changing a score calculated portion. Then, when the score between A and B is F (A, B), the similarity calculating unit 15 can calculate a similarity between A and B by calculating F (A, B)/F (A, A).

Specific processing content for score calculation will be explained below. First of all, the similarity calculating unit 15 calculates each element of three score matrix $X=\{x_{ij}|0\leq i\leq M, 0\leq j\leq N\}$, score matrix $Y=\{y_{ij}|0\leq i\leq M, 0\leq j\leq N\}$, and score matrix $Z=\{z_{ij}|0\leq i\leq M, 0\leq j\leq N\}$ between A and B by the following Equation (1) to Equation (3). The score matrix X is a matrix for managing a match/mismatch score between A and B. The score matrix Y is a matrix for managing a gap score of insertion in B. Moreover, the score matrix Z is a matrix for managing a gap score of deletion in A.

$$x_{ij} = \begin{cases} 0 & \text{if } i = 0 \text{ and } j \neq 0, \\ i \times \text{mismatch} & \text{if } j = 0, \\ \max \begin{cases} x_{i-1,j-1} + s(a_i, b_j) \\ y_{i,j} \\ z_{i,j} \end{cases} & \text{otherwise} \end{cases} \quad (1)$$

$$s(a_i, b_j) = \begin{cases} \text{match} & \text{if } a_i = b_j, \\ \text{mismatch} & \text{otherwise} \end{cases}$$

$$y_{ij} = \begin{cases} -\infty & \text{if } i = 0, \\ 0 & \text{if } j = 0 \text{ and } i \neq 0, \\ \max \begin{cases} y_{i-1,j} + e \\ x_{i-1,j} + o + e \end{cases} & \text{otherwise} \end{cases} \quad (2)$$

$$z_{ij} = \begin{cases} 0 & \text{if } i = 0 \text{ and } j \neq 0, \\ -\infty & \text{if } j = 0, \\ \max \begin{cases} z_{i,j-1} + e \\ x_{i,j-1} + o + e \end{cases} & \text{otherwise} \end{cases} \quad (3)$$

Although scores of match (character strings match) and mismatch (character strings do not match) in Equation (1) can be arbitrarily set, it is preferable that match (first value)>mismatch (second value) and values of |match| and |mismatch| are not too far apart from each other. In Equation (2) and Equation (3), o (open gap) is a starting score of gap (insertion or deletion of character string), and e (extended gap) is a continuing score of gap. Although the scores of o (third value) and e (fourth value) can be arbitrarily set, it is preferable that the values are e>mismatch, e>o, o<mismatch, e<0, and (mismatch×2)<(e+o). The reason will be explained later.

For example, as illustrated in FIG. 3, the similarity calculating unit 15 uses match=+2, mismatch=−2, o (open gap)=−3, and e (extended gap)=−0.5 as respective setting scores of match, mismatch, o (open gap), and e (extended gap).

That is, the similarity calculating unit 15 sets the score for a portion of a character string the same as the character string of A among the character strings of B to "match=+2", and sets the score for a portion of a character string different from the character string of A among the character strings of B to "mismatch=−2".

When there is a section in B in which a character string different from A is inserted or a section in B (section where a gap occurs) in which character strings of A are partially deleted, the similarity calculating unit 15 sets the score for a character string at the starting point of the section to "o=−3", and sets the score for a character string at the continuing point of the section to "e=−0.5".

For example, when the similarity calculating unit 15 compares the portion indicated by the reference sign 302 of B illustrated in FIG. 3 with the entire A, it is found that the portion indicated by the reference sign 301 has the same character strings as these of A but the section indicated by the reference sign 302 is inserted with different character strings from these of A. Therefore, in calculating the score, the similarity calculating unit 15 adds "2" for each character string other than the character strings in the section indicated by the reference sign 302, of the portion indicated by the reference sign 301 of B (match=+2). On the other hand, the similarity calculating unit 15 subtracts "3" for the starting point (character string indicated by reference sign 303) of the section indicated by the reference sign 302 (o=−3), and subtracts "0.5" for the respective continuing points (character strings indicated by the reference sign 304) (e=−0.5).

Although the description is omitted herein, when there is a character string different from the character string of A in the portion indicated by the reference sign 302 of B, the similarity calculating unit 15 subtracts "2" for the character string (mismatch=−2), and when there is a section in B in which the character strings of A are partially deleted, the similarity calculating unit 15 subtracts "3" for the character string at the starting point of the section (o=−3) and subtracts "0.5" for the respective character strings at the continuing points of the section (e=−0.5).

In calculating the score described above, by using values of e>o and (mismatch×2)<(e+o), such as o=−3 and e=−0.5, a score to which the insertion or the deletion is reflected can be calculated when there is a section in B in which a part of A is inserted or deleted (section where a gap occurs).

For example, when the similarity calculating unit 15 calculates respective scores as "−2" by determining all the character strings of the section indicated by the reference sign 302 in FIG. 3 as mismatch, the score of the section is "−2×5=−10", but by using the values that will be (mismatch×2)<(e+o), such as o=−3 and e=−0.5, the score of the section is "−3+(−0.5)×4=−5".

Moreover, by using values that will be e>o for o and e, such as o=−3 and e=−0.5, the similarity calculating unit 15 can prevent a large difference from occurring in the values of the score depending on the length of the section where the gap occurs in B. For example, when the length of the section where the gap occurs in B is "2", the score is "−3+(−0.5)=−3.5". On the other hand, when the length of the section where the gap occurs in B is "5", the score is "−3+(−0.5)×4=−5". Therefore, in the case in which the section where the gap occurs in B is "2" and the case of "5", the difference between the respective scores can be made to about "1.5".

The similarity calculating unit 15 uses the three score matrices calculated using the method to calculate F (A, B)/F (A, A) based on a maximum score point $j_{max}$ obtained by the following Equation (4).

$$j_{max} = \underset{1 \le j \le N}{\operatorname{argmax}} \, x_{Mj} \quad (4)$$

For example, when the similarity calculating unit 15 uses the Equation (1) to Equation (3) targeting A and B illustrated in FIG. 3 to calculate score matrices (matrices) X, Y, and Z, calculation results of these matrices are as illustrated in FIG. 4 to FIG. 6 respectively. Here, when the similarity calculating unit 15 calculates the maximum score point $j_{max}$ based on the Equation (4), "18.5" is obtained (see $j_{max}$ of the matrix X illustrated in FIG. 4). That is, F (A, B)=$j_{max}$=18.5. Moreover, F (A, A)=match×|A|=24. Therefore, the similarity calculating unit 15 calculates the similarity of the portion indicated by the reference sign 301 of B in FIG. 3 to the entire A as F (A, B)/F (A, A)=18.5/24=Similarity 77%.

The similarity calculating unit 15 executes the same processing as above to any section, as a target, other than the section in which the maximum score point $j_{max}$ (e.g., 18.5) is obtained by calculating the previous similarity from B in order to search for more similar portion of A from B, calculates the maximum score point $j_{max}$, and calculates F (A, B)/F (A, A). By doing it in this way, the similarity calculating unit 15 can calculate the similarity of any portion in B to A. The calculation result is stored in a predetermined area of a storage (not illustrated) of the vulnerability detection device 10 and is read when the determining unit 16 performs determination processing.

Determining Unit

Figure 7:
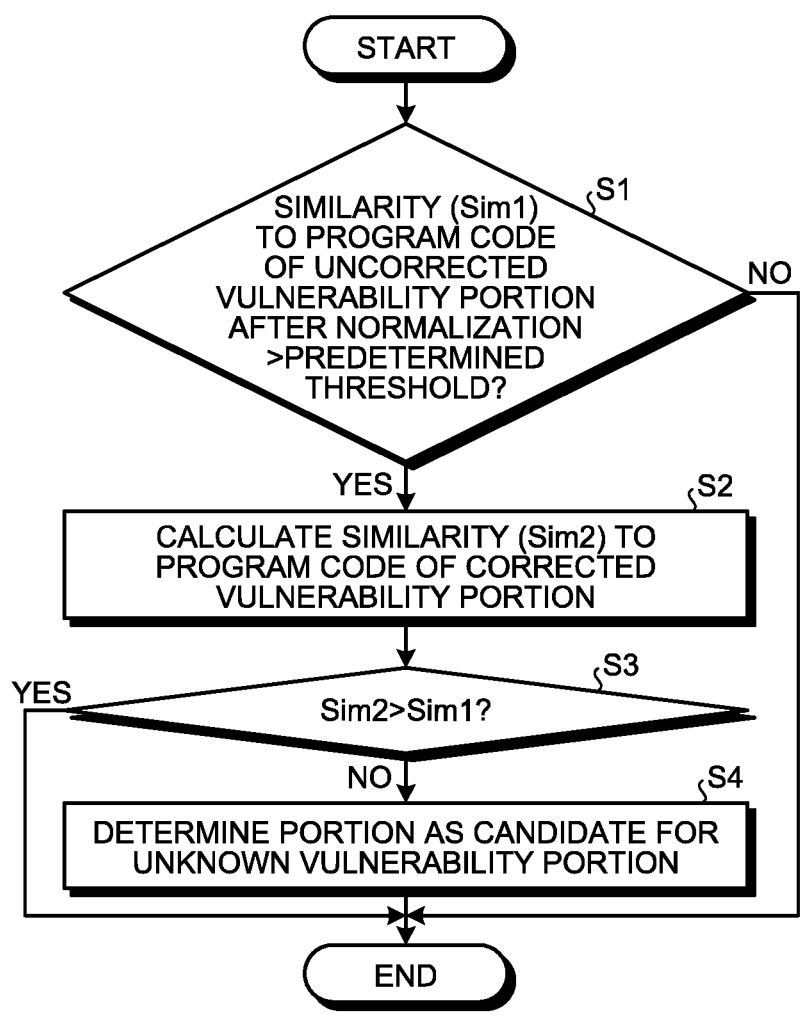
FIG. 7 is a flowchart illustrating a procedure of a determining unit.

The processing performed by the determining unit 16 will be explained in detail next with reference to FIG. 7. The determining unit 16 first regards a portion of a program code to be tested after normalization (hereinafter abbreviated as a test target program code), as a code clone portion of vulnerability, in which the similarity to the program code of an uncorrected vulnerability portion after normalization (hereinafter abbreviated as program code of an uncorrected vulnerability portion) calculated by the similarity calculating unit 15 exceeds the predetermined threshold, and then determines whether the portion is an unknown vulnerability portion.

Specifically, at first, the determining unit 16 reads the calculation results of the similarities of portions of the test target program code by the similarity calculating unit 15 from the storage (not illustrated), and determines whether the similarity (Sim1) of each portion of the test target program code to the program code of the uncorrected vulnerability portion exceeds a predetermined threshold (S1). Here, when there is any portion in the test target program code, in which the similarity (Sim1) to the program code of the uncorrected vulnerability portion exceeds the predetermined threshold (Yes at S1), the determining unit 16 calculates a similarity (Sim2) of the portion to the program code of a corrected vulnerability portion (S2). The calculation of the similarity herein should be performed, for example, by using the same method as the similarity calculation performed in the similarity calculating unit 15, and, for the program code of the corrected vulnerability portion, for example, the information for patch applied program code included in the vulnerability related information in the vulnerability related DB 11 is referred to. On the other hand, when it is determined that there is no portion, in the test target program code, in which the similarity (Sim1) to the program code of the uncorrected vulnerability portion exceeds the predetermined threshold (No at S1), the determining unit 16 ends the process.

After S2, the determining unit 16 compares the similarity (Sim2) of the portion to the program code of the corrected vulnerability portion calculated at S2 with the similarity (Sim1) thereof to the program code of the uncorrected vulnerability portion, and ends the process when it is determined that Sim2>Sim1 (Yes at S3). That is, when the portion is more similar to the program code of the corrected vulnerability portion than the program code of the uncorrected vulnerability portion, the determining unit 16 ends the process. On the other hand, when it is determined that Sim2 Sim1 (No at S3), the determining unit 16 determines the portion as a candidate for an unknown vulnerability portion (S4). In other words, when the similarity (Sim1) of the portion to the program code of the uncorrected vulnerability portion is not less than the similarity (Sim2) to the program code of the corrected vulnerability portion calculated at S2, the determining unit 16 determines the portion as a candidate for the unknown vulnerability portion. That is to say, the determining unit 16 determines the portion determined that Sim2 is not less than Sim1 as a portion more likely to be the known vulnerability portion, and excludes the portion from the candidate for the unknown vulnerability portion.

Which portion in the test target program code is the portion can be calculated by tracing back, to i=1, the element selection order in calculation formula of each matrix (score matrices X, Y, and Z) that reaches calculation of $j_{max}$ starting at the maximum score point $j_{max}$ calculated in the similarity calculating unit 15. This operation is called "traceback". In the traceback, the previous element that calculates the element currently being focused on, that is, any one of (i−1, j−1), (i−1, j), and (i, j−1) is traced back. Specifically, in order to perform the traceback, the similarity calculating unit 15 separately creates pointer matrices P, Q, and R indicated in the following Equation (5) that holds the selection order according to each score matrix when the three score matrices X, Y, and Z are calculated, and stores the created pointer matrices in the storage (not illustrated). As the pointers, the types of the matrix of elements used for calculating the current element and the locations of the elements are held.

$$P = \{p_{ij} \in \{\nwarrow x, \bullet y, \bullet z\} | 1 \le i \le M, 1 \le j \le N\}$$

$$Q = \{q_{ij} \in \{\uparrow x, \uparrow y\} | 1 \le i \le M, 1 \le j \le N\}$$

$$R = \{r_{ij} \in \{\leftarrow x, \leftarrow z\} | 1 \le i \le M, 1 \le j \le N\} \quad (5)$$

where
$\nwarrow$: (i−1, j−1)
$\uparrow$: (i−1, j)
$\leftarrow$: (i, j−1)
$\bullet$: (i, j)

The similarity calculating unit 15 calculates each element of the three pointer matrices using the following Equation (6) to Equation (8).

$$p_{ij} = \begin{cases} \nwarrow x & \text{if } x_{ij} = x_{i-1,j-1} + s(a_i, b_j) \\ \bullet y & \text{if } x_{ij} = y_{i,j} \\ \bullet z & \text{if } x_{ij} = z_{i,j} \end{cases} \quad (6)$$

$$q_{ij} = \begin{cases} \uparrow x & \text{if } y_{ij} = x_{i-1,j} + o + e \\ \uparrow y & \text{if } y_{ij} = y_{i-1,j} + e \end{cases} \quad (7)$$

$$r_{ij} = \begin{cases} \leftarrow x & \text{if } z_{ij} = x_{i,j-1} + o + e \\ \leftarrow z & \text{if } z_{ij} = z_{i,j-1} + e \end{cases} \quad (8)$$

According to the vulnerability detection device 10 as explained above, it is possible to detect a candidate for an unknown vulnerability portion using the code clone from the test target program code.

Moreover, the vulnerability detection device 10 explained in the embodiment can be implemented by installing a vulnerability detection program executing the processing into a desired information processing device (computer). For example, by causing the information processing device to execute the vulnerability detection program provided as package software or online software, the information processing device can be functioned as the vulnerability detection device 10. The information processing device mentioned here includes a desktop personal computer or a notebook personal computer. In addition, the information processing device includes a mobile communication terminal such as a smartphone, a mobile phone, and a PHS (Personal Handyphone System), and further includes a slate terminal or the like such as PDA (Personal Digital Assistants). Moreover, the vulnerability detection device 10 may be implemented as a Web server or a cloud.

Programs

Figure 8:
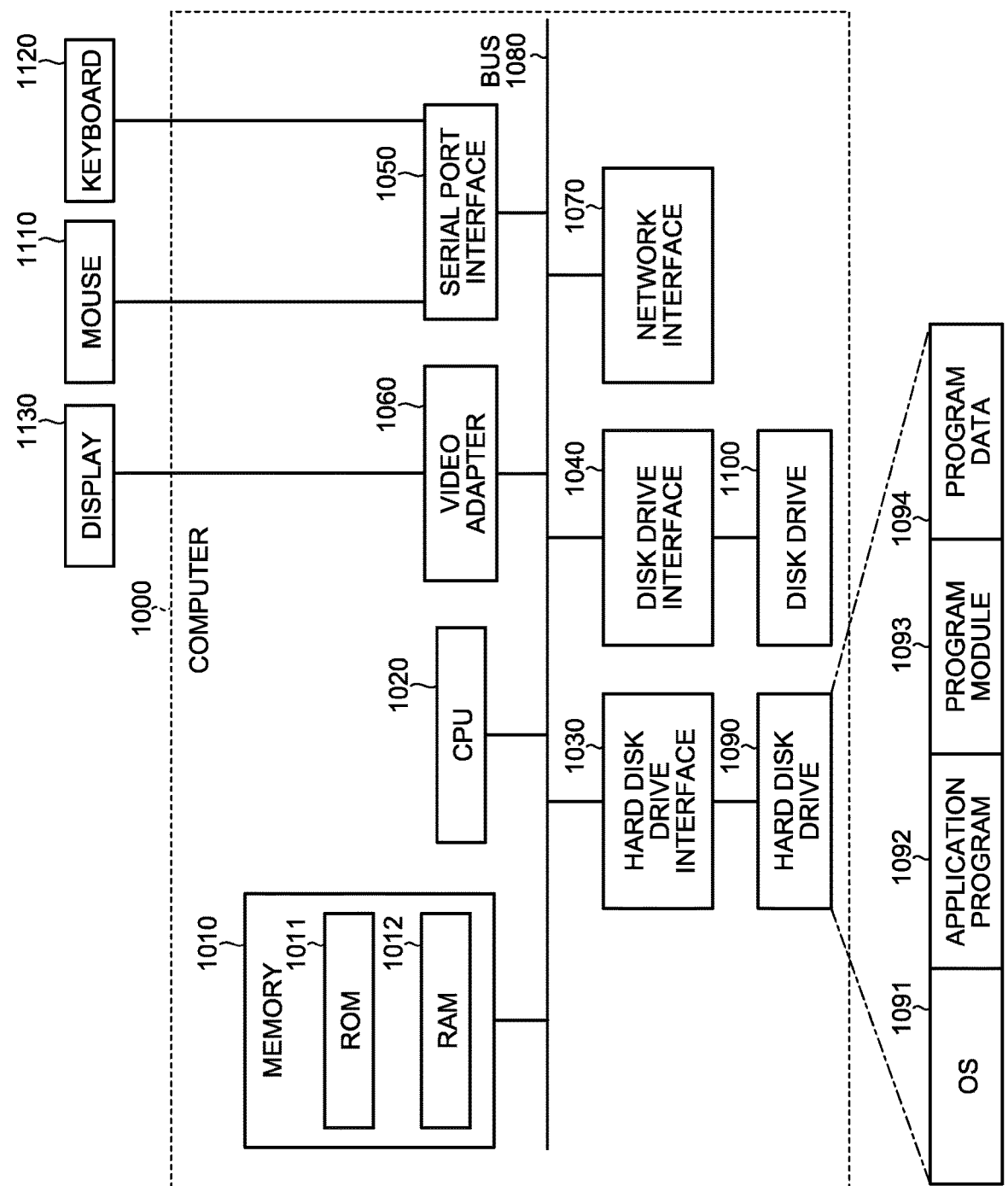
FIG. 8 is a diagram illustrating that information processing by a vulnerability detection program is concretely implemented by using a computer.

FIG. 8 is a diagram illustrating a computer that executes the vulnerability detection program. As illustrated in FIG. 8, a computer 1000 includes, for example, a memory 1010, a CPU (Central Processing Unit) 1020, a hard disk drive interface 1030, a disk drive interface 1040, a serial port interface 1050, a video adapter 1060, and a network interface 1070. These units are connected to each other through a bus 1080.

The memory 1010 includes ROM (Read Only Memory) 1011 and RAM (Random Access Memory) 1012. The Rom 1011 stores, for example, a boot program such as BIOS (Basic Input Output System). The hard disk drive interface 1030 is connected to a hard disk drive 1090. The disk drive interface 1040 is connected to a disk drive 1100. For example, a removable storage medium such as a magnetic disk and an optical disk is inserted in the disk drive 1100. The serial port interface 1050 is connected with, for example, a mouse 1110 and a keyboard 1120. The video adapter 1060 is connected with, for example, a display 1130.

As illustrated in FIG. 8, the hard disk drive 1090 stores, for example, an OS 1091, an application program 1092, a program module 1093, and program data 1094. Each pieces of information and data described in the embodiment is stored, for example, in the hard disk drive 1090 and the memory 1010.

The vulnerability detection program is stored in the hard disk drive 1090 as, for example, the program module 1093 in which instructions executed by the computer 1000 are written. Specifically, the program module 1093, in which the processes executed by the vulnerability detection device 10 explained in the embodiment are written, is stored in the hard disk drive 1090.

The data used for information processing by the vulnerability detection program is stored, for example, in the hard disk drive 1090 as the program data. The CPU 1020 loads the program module 1093 or the program data 1094 stored in the hard disk drive 1090 into the RAM 1012 as needed, and executes the procedures.

The program module 1093 and the program data 1094 according to the vulnerability detection program are not limited to the case where both are stored in the hard disk drive 1090, and may be stored in, for example, a removable storage medium and read by the CPU 1020 via the disk drive 1100 etc. Alternatively, the program module 1093 and the program data 1094 according to the vulnerability detection program may be stored in other computer connected thereto via a network such as LAN (Local Area Network) and WAN (Wide Area Network) and may be read by the CPU 1020 via the network interface 1070.

REFERENCE SIGNS LIST 10 vulnerability detection device
11 vulnerability related DB
12 disassembling unit
13 vulnerability portion extracting unit
14 normalization processing unit
15 similarity calculating unit
16 determining unit
17 output unit

The invention claimed is:

1. A vulnerability detection device comprising:
a memory; and
a processor coupled to the memory and programmed to execute a process comprising:
extracting a first program code corresponding to an uncorrected vulnerability portion of software;
normalizing a parameter varying depending on compilation environment, among parameters included in the first program code and in a second program code of software as a target to be tested for the vulnerability portion;
calculating a first similarity which is a similarity of an arbitrary portion of the second program code after normalization as a comparison target to the first program code;
referring to vulnerability related information for a portion of the second program code in which the calculated first similarity exceeds a predetermined threshold, and determining whether the portion of the second program code is an unknown vulnerability portion; and
outputting the portion of the second program code determined as the unknown vulnerability portion,
wherein when calculating the first similarity, the process includes adding a first value for a portion of a character string same as a character string of the first program code in the second program code after normalization, adding a second value lower than the first value for a portion of a character string different from the character string of the first program code, and, when there is a section in which the character string different from that of the first program code is inserted into the second program code after normalization or when there is a section in which character strings of the first program code are partially deleted, adding a third value lower than the second value for a character string at a starting point of the section, and adding a fourth value which is higher than the third value and lower than 0 for a character string at a continuing point of the section.

2. The vulnerability detection device according to claim 1, wherein the process further comprises
setting, as the third value and the fourth value, a value so that a total value of the third value and the fourth value is a value higher than a value twice as much as the second value.

3. The vulnerability detection device according to claim 1, wherein the process further comprises
calculating a second similarity which is a similarity of the portion of the second program code where the first similarity exceeds the predetermined threshold to the program code of a corrected vulnerability portion to be registered in the vulnerability related information for the portion, and, when the calculated second similarity is not less than the first similarity, excluding the portion of the second program code from the unknown vulnerability portion.

4. A vulnerability detection method comprising:
a step of extracting a first program code corresponding to an uncorrected vulnerability portion of software;
a step of normalizing a parameter varying depending on compilation environment, among parameters included in the extracted first program code and in a second program code of software as a target to be tested for the vulnerability portion;
a step of calculating a first similarity which is a similarity of an arbitrary portion of the second program code after normalization as a comparison target to the first program code;
a step of referring to vulnerability related information for a portion of the second program code in which the calculated first similarity exceeds a predetermined threshold, and determining whether the portion of the second program code is an unknown vulnerability portion; and
a step of outputting the portion of the second program code determined as the unknown vulnerability portion,
wherein when calculating the first similarity, the method includes adding a first value for a portion of a character string same as a character string of the first program code in the second program code after normalization, adding a second value lower than the first value for a portion of a character string different from the character string of the first program code, and, when there is a section in which the character string different from that of the first program code is inserted into the second program code after normalization or when there is a section in which character strings of the first program code are partially deleted, adding a third value lower than the second value for a character string at a starting point of the section, and adding a fourth value which is higher than the third value and lower than 0 for a character string at a continuing point of the section.

5. A non-transitory computer readable storage medium having stored therein a vulnerability detection program for causing a computer to execute a process comprising:
a step of extracting a first program code corresponding to an uncorrected vulnerability portion of software;
a step of normalizing a parameter varying depending on compilation environment, among parameters included in the extracted first program code and in a second program code of software as a target to be tested for the vulnerability portion;
a step of calculating a first similarity which is a similarity of an arbitrary portion of the second program code after normalization as a comparison target to the first program code;
a step of referring to vulnerability related information for a portion of the second program code in which the calculated first similarity exceeds a predetermined threshold, and further determining whether the portion of the second program code is an unknown vulnerability portion; and
a step of outputting the portion of the second program code determined as the unknown vulnerability portion,
wherein when calculating the first similarity, the process includes adding a first value for a portion of a character string same as a character string of the first program code in the second program code after normalization, adding a second value lower than the first value for a portion of a character string different from the character string of the first program code, and, when there is a section in which the character string different from that of the first program code is inserted into the second program code after normalization or when there is a section in which character strings of the first program code are partially deleted, adding a third value lower than the second value for a character string at a starting point of the section, and adding a fourth value which is higher than the third value and lower than 0 for a character string at a continuing point of the section.

* * * * *